J. McDonald,
Cant Dog.

Nº 81,098. Patented Aug. 18, 1868.

Witnesses.

Inventor:
Joseph McDonald
per Alexander D. Mason
Attys

United States Patent Office.

JOSEPH McDONALD, OF OSHKOSH, WISCONSIN.

Letters Patent No. 81,098, dated August 18, 1868.

---

IMPROVEMENT IN CANT-HOOKS.

---

The Schedule referred to in these Letters Patent and making part of the same.

---

TO ALL WHOM IT MAY CONCERN:

Be it known that I, JOSEPH McDONALD, of Oshkosh, in the county of Winnebago, and State of Wisconsin, have invented certain new and useful Improvements in "Cant-Hooks;" and do hereby declare that the following is a full, clear, and exact description thereof, reference being had to the accompanying drawings, and to the letters of reference marked thereon, making a part of this specification.

Figure 1:
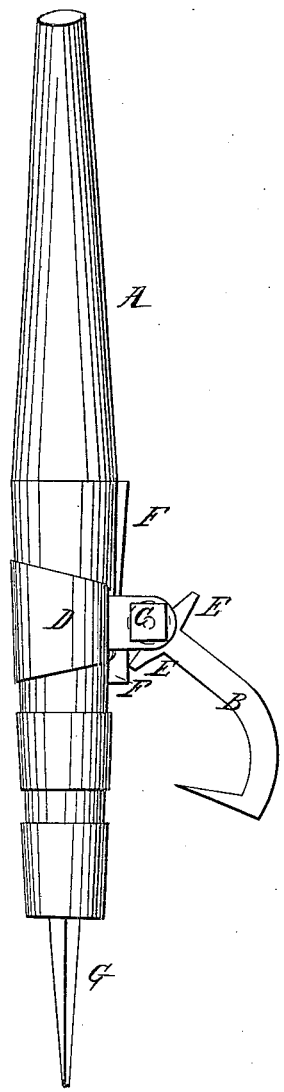
Figure 2:
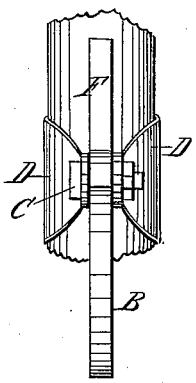

Figure 1 represents a side view,

Figure 2 a plan view, and

Figure 3:
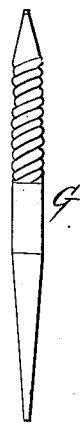

Figure 3 a view of the spike.

My invention consists in the construction of the cant-hook in such a manner that it will not fall too far forward or too far backwards in its operation; also, in the formation of the spike so that it can be easily extracted from, or added to, the cant-hook handle, and cannot be lost therefrom.

In the annexed drawings—

A represents the usual handle, to the end of which is inserted the spike G. This spike is made of cast steel, in a square form, and with a tapering point. After being made square it is heated to a red heat and twisted at one end, in the form shown in fig. 3, and with a point above the twist, and is then inserted in the handle A. Suitable bands near the end of the handle prevent the same from splitting.

D represents a band, which is passed around the handle, and forms ears at the upper or top part. Between these ears is secured the cant-hook B, by means of a bolt, C, and nut. The curve and hook portion of this hook B is formed in the usual manner, but just above the pivot extend (front and rear) two bars, E, at right angles from the base of the hook. These bars act as stoppers, and prevent the hook from falling too far down towards the front or rear part of the handle A.

Between the ears of the band D, and below the pivot of the hook, is secured a horizontal metal bar, E, on the handle A. The stoppers E act against this bar, which prevents the wearing of the handle, which would otherwise be weakened.

By the construction of the spike G in a screw-form at its inserted end, I am enabled to readily extract the same whenever it is desired, and as easily replace another.

Having thus fully described my invention, what I claim as new, and desire to secure by Letters Patent, is—

The combination of the hook B and its stoppers E E with band D, bar F, and the handle A, the several parts being constructed to operate substantially as described.

In testimony that I claim the foregoing, I have hereunto set my hand, this 2d day of April, 1868.

JOSEPH McDONALD.

Witnesses:
CHARLES STEVENSON,
WILLIAM SPIKES.